March 24, 1964 A. KORN ETAL 3,126,541

RADIO LOCATIONS SYSTEMS

Original Filed Aug. 30, 1941 5 Sheets-Sheet 1

INVENTOR.
ARTHUR KORN, JOSEPH W. HESS
SIMON L. RUSKIN
BY [signature]
ATTORNEY.

INVENTOR.
ARTHUR KORN, JOSEPH W. HESS
SIMON L. RUSKIN
BY Theodor Haque
ATTORNEY.

March 24, 1964 A. KORN ETAL 3,126,541

RADIO LOCATIONS SYSTEMS

Original Filed Aug. 30, 1941 5 Sheets-Sheet 3

INVENTOR.
ARTHUR KORN, JOSEPH W. HESS
SIMON L. RUSKIN
BY Theodore Hoefer
ATTORNEY.

INVENTOR.
ARTHUR KORN, JOSEPH W. HESS
SIMON L. RUSKIN
BY
ATTORNEY.

INVENTOR.
ARTHUR KORN, JOSEPH W. HESS
SIMON L. RUSKIN
BY Theodore Haefner
ATTORNEY.

United States Patent Office 3,126,541

Patented Mar. 24, 1964

3,126,541

RADIO LOCATIONS SYSTEMS

Arthur Korn, deceased, late of Newark, N.J., by Elizabeth P. Korn, administratrix, Hoboken, N.J., Joseph W. Hess, deceased, late of Hoboken, N.J., by Adele Hess, administratrix, Los Altos, Calif., and Simon L. Ruskin, New York, N.Y., assignors to Union Carbide Corporation, a corporation of New York Application May 31, 1952, Ser. No. 292,756, now Patent No. 2,894,259, dated July 7, 1959, which is a continuation of application Ser. No. 760,588, July 12, 1947, and application Ser. No. 408,944, Aug. 30, 1941. Divided and this application July 2, 1959, Ser. No. 78,797
26 Claims. (Cl. 343—10)

This invention relates to radio location systems and more particularly to a system for rapid evaluation and transformation into electrical signals, of the position of one or more cathode ray spots travelling over one or more fluorescent screens, in accordance with the movement, coordinates or parameters of such movement, of an object to be located in space.

This is a divisional application of U.S. Ser. No. 292,756 filed May 31, 1952, issued on July 7, 1959 under U.S. patent specification No. 2,894,259 which in turn is a continuation of U.S. Ser. No. 760,588 (now abandoned) filed July 12, 1947 and relating to Radar Space Location Chart etc., and U.S. Ser. No. 408,944 (now abandoned), filed August 30, 1941, relating to Devices for Determining the Position of Targets in Motion.

One of the objects of this invention is a radio location system in which the fluorescent screen or screens of one or more cathode ray tubes are scanned to permit indication, visual or electrical, of the spot or spots such as corresponding to the position of a body to be located in space, and in which such indication or indications are transformed into visual and/or electrical signals of predetermined timing and/or intensity ready for further evaluation and transmission.

These and other objects of the invention will be more fully described in the drawings annexed or attached herewith in which FIG. 1 illustrates generally in a system of rectangular coordinates the mathematical connections between the main values used in the present invention for determining the changes in the position of a target in motion viz. the angles of directions and the distance of the observer to the target.

Figure 4:
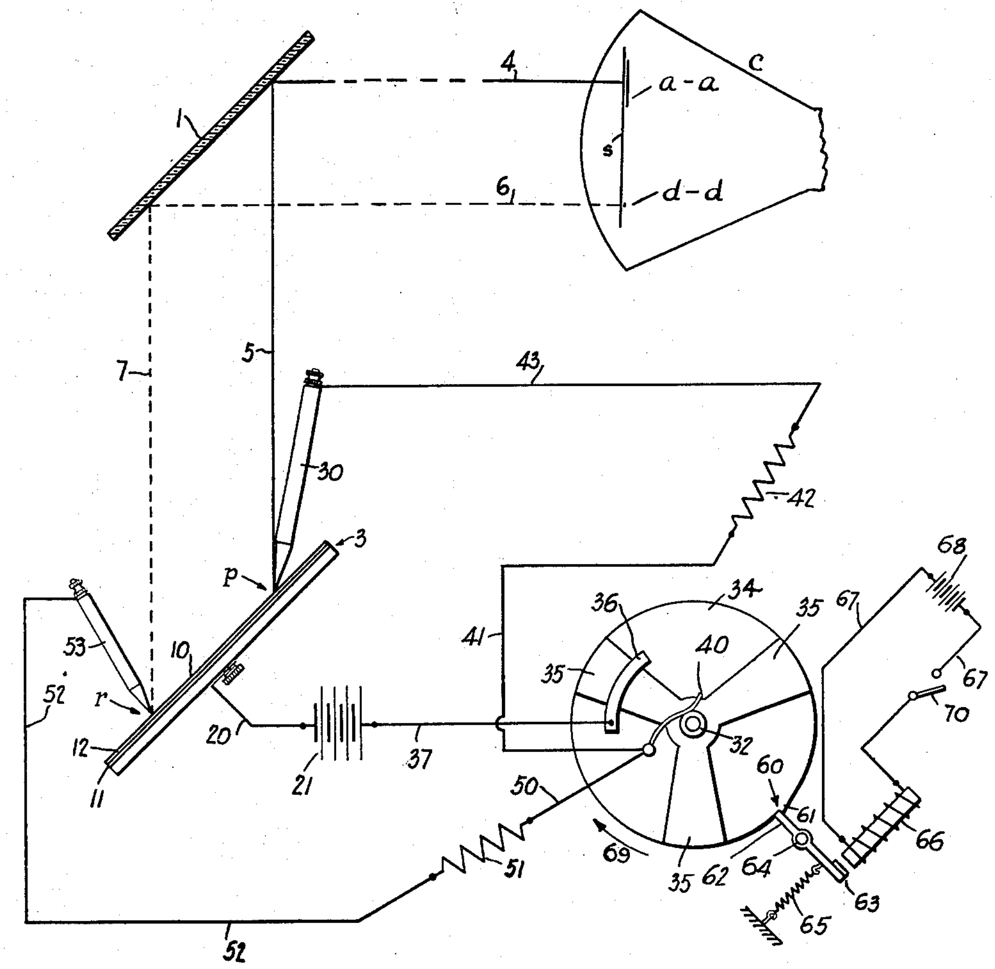
FIG. 4 is a schematic drawing of a device for producing a spot pattern such as shown in FIGS. 2 and 3 in the form of visual marks at selected intervals representing the directions and distance points of the target.
Figure 4A:
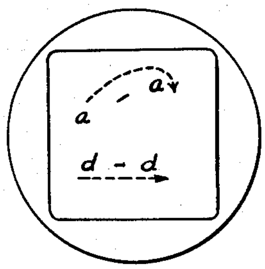

FIG. 4*a* shows the changes in direction and distance as they are traced on adjacent sections of a common cathode tube screen.

Figures 5, 6:
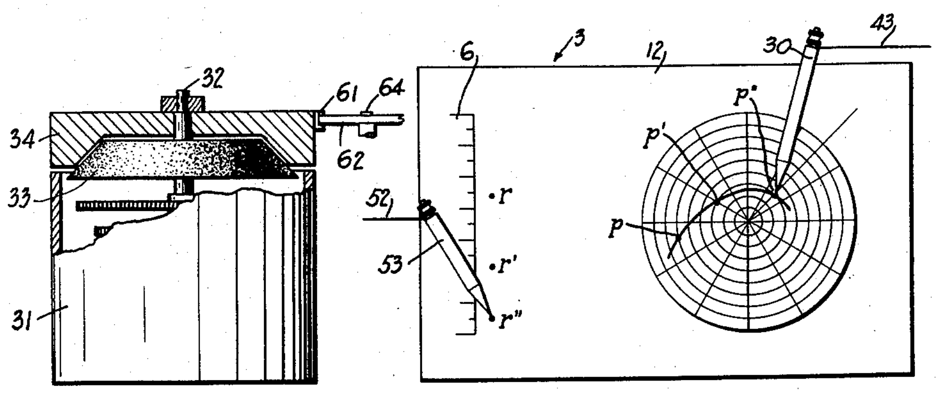

FIG. 5 shows in cross section a periodic interrupter used in the device illustrated in FIG. 4 serving the purpose of marking the directions and distance points at selected intervals on the display panel of the device.

FIG. 6 shows in a plan view the display panel of the device according to the invention during the operation of the device as illustrated in FIG. 4.

Figure 7:
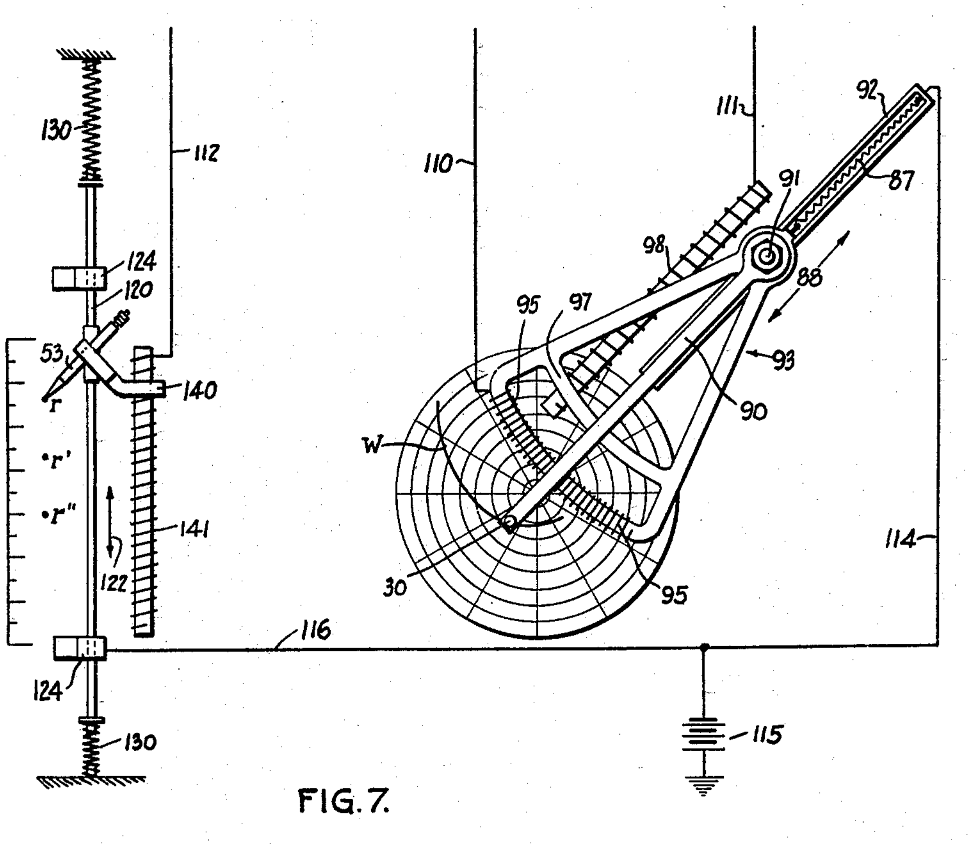

FIG. 7 illustrates in a plan view a reception plate for the direction and distance points of the target in combination with auxiliary apparatuses for the automatic direction of the gun.

Figure 8:
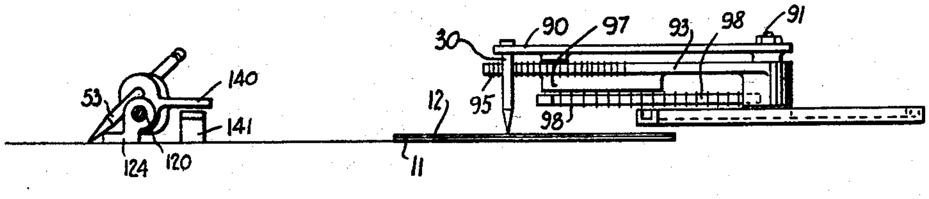

FIG. 8 is a side view of the two auxiliary apparatuses of the device illustrated in FIG. 7 enabling the transfer to the device for the automatic direction of the gun of the changes of the direction and distance points of the target.

Figure 9:
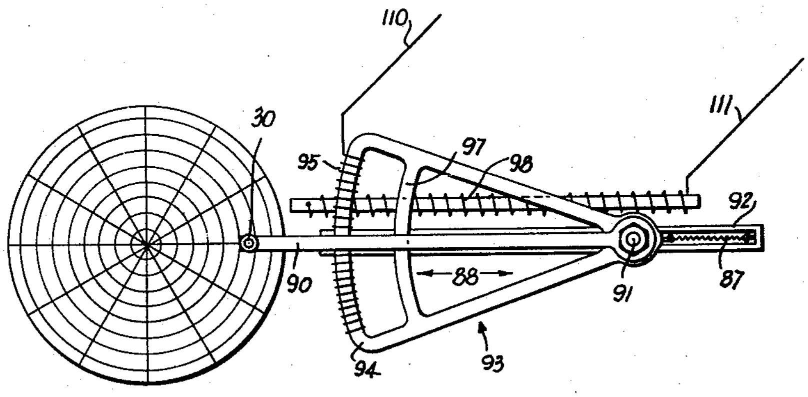

FIG. 9 shows on an enlarged scale and in a plan view the transfer apparatus for the changes of the direction points received on the reception plate of the device in another position to the polar coordinate system as illustrated in FIG. 7.

Figure 10:
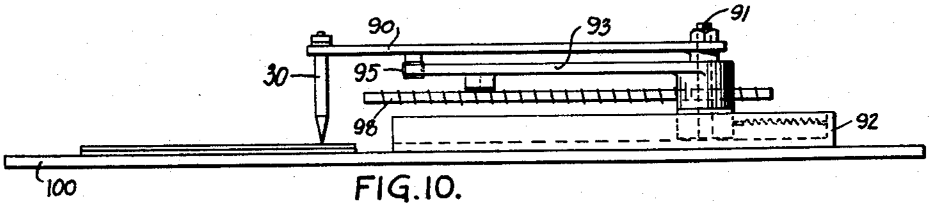

FIG. 10 is a side view of the transfer apparatus as illustrated in FIG. 9.

Figure 11:
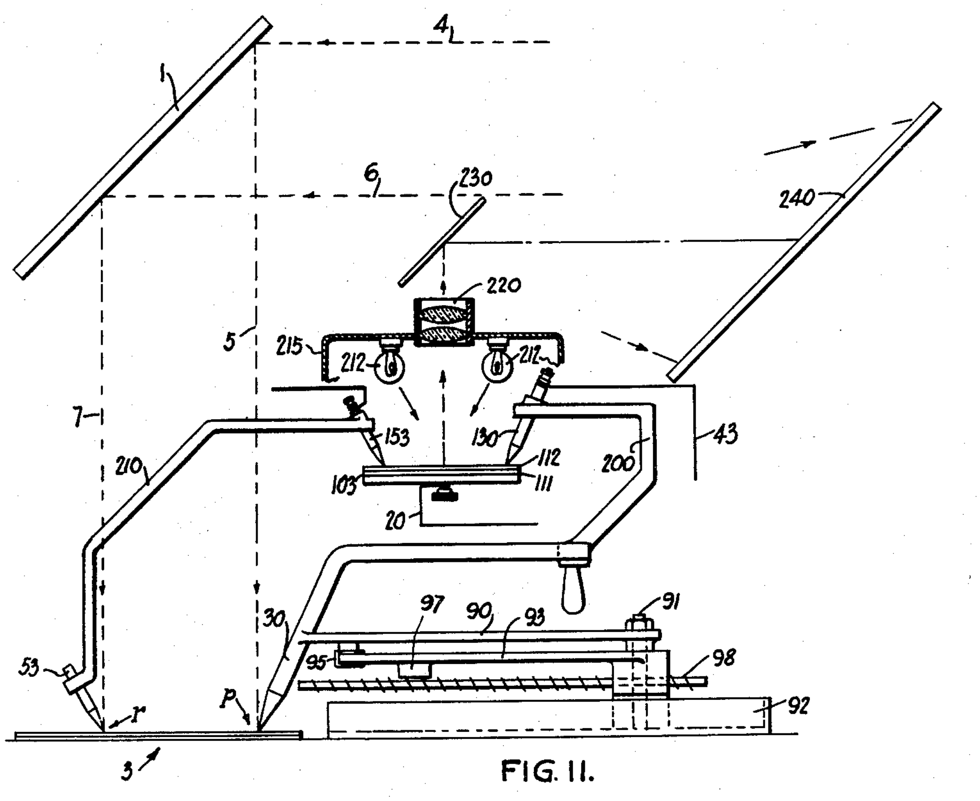

FIG. 11 is a schematic drawing of another device in accordance with the invention for determining the position of a target in motion and having auxiliary means for projecting the paths of the received direction and distance points in enlarged dimension.

Figure 12:
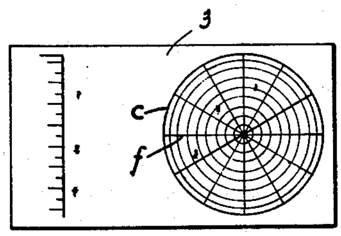

FIG. 12 shows in a plan view the first reception plate for the direction and distance points of the device as illustrated in FIG. 11.

Figure 13:
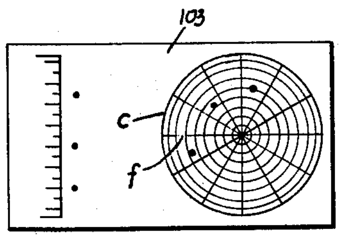

FIG. 13 shows in a plan view a second reception plate for the direction and distance points of the device as illustrated in FIG. 11.

Figure 14:
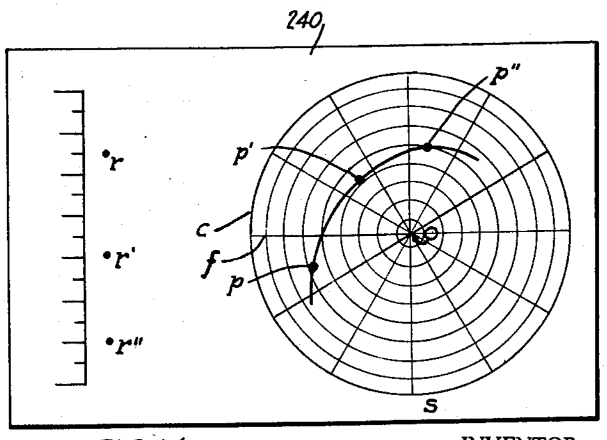

FIG. 14 shows in a plan view a third reception plate on which the path of the direction and distance points of the first and second reception plate appears in enlarged dimensions.

Figures 1, 2:
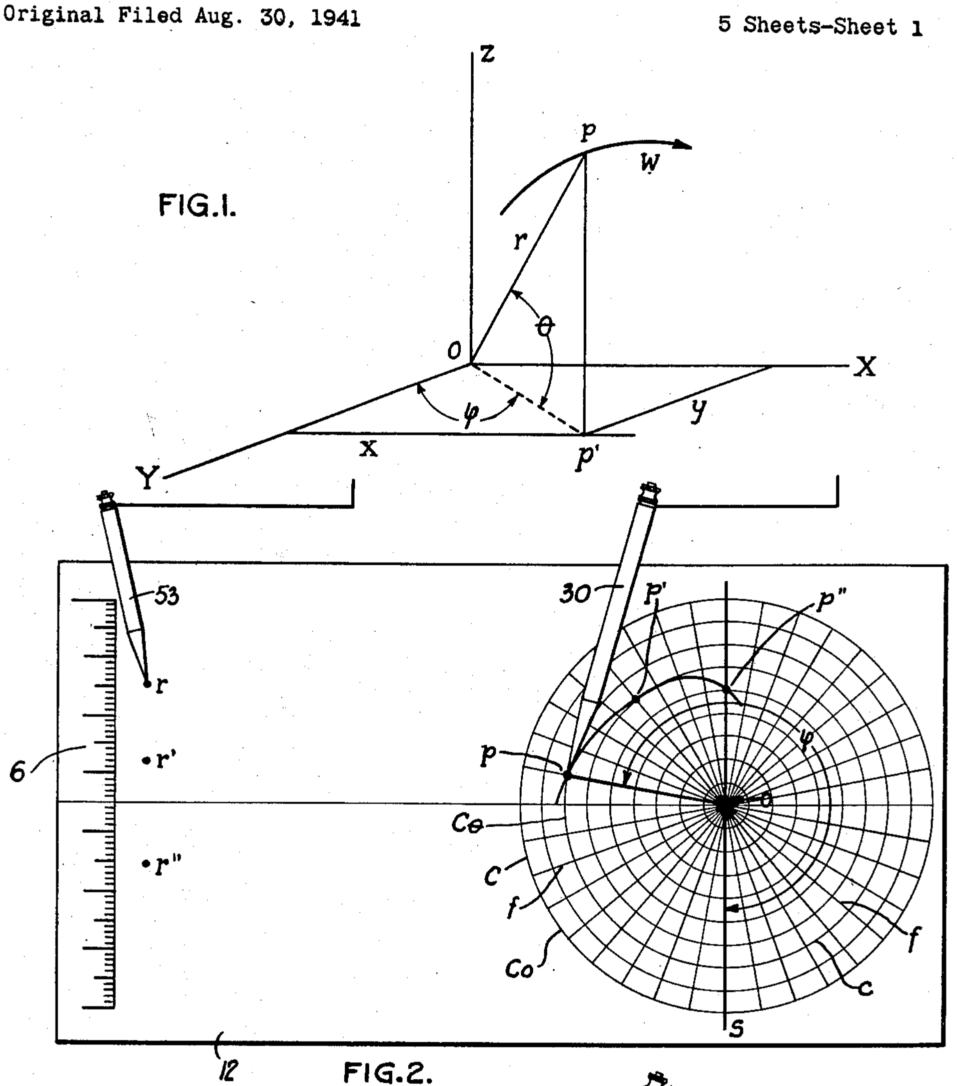
FIG. 2 shows in a plan view in enlarged scale a registration panel displaying two arrays of cathode ray spots reproduced from two cathode ray tubes and corresponding respectively to the direction points and of the distance points of a travelling target brought into view and transformed into visually evaluable electrical signals in accordance with the invention.

Referring to the drawings, X, Y, Z of FIG. 1 are the axes of a system of rectangular coordinates, $p$ a target, e.g., an aircraft, moving in space. O denotes the origin of the system of coordinates at which the observer is located; $r$ is the distance O$p$ of the target from the observer. O$p'$ is a projection of the distance O$p$ on the XY plane. The angle $\theta$ is the angle of elevation. The angle $\varphi$ is the angle between O$p'$ and the Y axis which may be for example the direction from the observer towards the southpoint (azimuth). The curve W through the point $p$ with the arrow illustrates the path of the moving target.

It is already known how one can determine by means of a radio locator at any given time $t$ the values $r$, $\theta$ and $\varphi$. In scientific terms radio locators are defined as radio apparatus of any kind serving for the location in space of objects such as airplanes. The principle of such radio locators is based upon the fact that an aircraft when flying in the field of an ultra-short wave transmitter is capable of reflecting waves directed thereto at varying angles of azimuth and elevation thereby indicating by its reflection from the target the elevation of the target for a given azimuth; and that reflected waves obtained at an ultra-short wave receiver from a transmitter by reflection from an aircraft will arrive with a time interval (which will vary as the aircraft moves) with respect to the arrival of corresponding waves which have travelled direct from the transmitter to the receiver thereby indicating the distance of the target.

By means of such a radio locator it is also possible to find at any later moment $t'$ the values $r'$, $\theta$ and $\varphi$. With additional calculations one can find the corrections necessary for taking into account the motion of the target. This method is of no practical use because of the expenditure of time necessary for the calculations and the rapidity of the movements of the aircraft.

According to the invention, complicated calculations for the corrections necessitated by the motion of the target are avoided and a quick and readily evaluable measure of the rate of change in the movement of the target can be obtained.

It is known that one can cause to appear, by means of a radio locator and a known cathodic tube device, the image of a moving target as an illuminated point on a fluorescent screen of a cathodic tube. With the radio locator covering for every angle of azimuth, several angles of elevation, and the cathodic tube having a fluorescent screen scanned radially as well as circumferentially respectively in accordance with the azimuthal and elevational changes in direction of the radio locator, every value of $\theta$ and $\varphi$ in space there corresponds a certain point (direction point) on the screen. That is, one can recognize by the position of the illuminated point on the screen the direction of the target.

By means of a radio locator and another cathodic tube device one can in known manner also cause to appear an illuminated point representing the time interval between the transmitted and reflected waves (distance point) on a narrow fluorescent screen scanned in perpendicular directions in the tube along a measuring scale determined by the time intervals of the waves which have travelled directly from transmitter to receiver. By this arrangement one can recognize by the position of this point the distance of the target from the observer.

Thus one is enabled to obtain visual data and the distance of the moving target.

Figure 3:
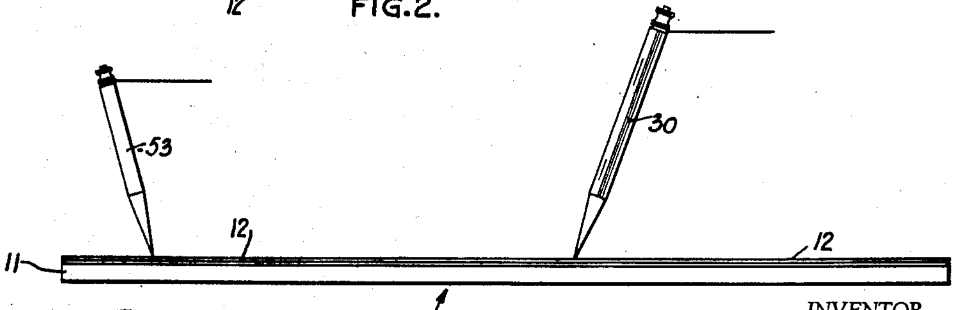
FIG. 3 is a side view of the registration device illustrated in FIG. 2.

Under these assumptions, see FIGS. 2 and 3, two different sequences of points appear upon surface 3. One sequence $p$, $p'$, and $p''$ . . . represents the path W shown in FIG. 7 of the direction point. Another sequence $r$, $r'$, $r''$ . . . represents, if measured on the linear measuring scale, the distance of the moving target from the observer.

In FIG. 4, the known screen of a known cathodic tube device with its illuminated direction point $p$ is reflected from a mirror 1 onto a surface 3. The path of the light rays coming from the direction point is illustrated by the lines 4, 5. The screen with the linear measuring scale of the second cathodic tube which as shown in FIGS. 4 and 4*a* may be arranged together with the first cathodic tube in the same envelope having a common fluorescent screen with two separate display sections, *a—a* and *d—d*, respectively, is also reflected from the mirror 1 on surface 3 by the illuminated distance point 4. The path of these rays coming from the distance points is illustrated by the lines 6, 7.

In the example illustrated in FIG. 4, the surface 3 is a conducting plate, for instance, of aluminum or other metal. Plate 3 is connected to one pole of battery 21 by wire 20. Plate 3 carries interchangeably a foil 11, 12 consisting of one or several layers. This foil has such a structure, that by means of an electrode, for example, a metallic style 30 a visual mark is produced whenever an electrical current passes from style 30 through foil 11, 12 on plate 3. In the example illustrated in FIG. 4 the foil consists of two layers. One layer 11 consists of conducting material such as a tin foil, the other layer 12 is of nonconducting material, for example, of fibrous material such as paper, upon which under the influence of the current passing from pointed style 30, visual marks are produced. The layer 12 can also consist of fibrous material impregnated with a proper chemical solution changing its color under the influence of the electrical current below the point of style 30. The arrangement and structure of the before mentioned auxiliary device can be changed. It is only essential that by this device persisting visual marks can be produced upon the foil below the positions of style 30 at determined periods.

According to the example of the invention illustrated in the FIGS. 2, 3, 4 a second metallic style 53 is provided, which is capable of sliding with its point on surface 3. This style 53 may also produce persisting visual marks on the surface of the foil along the linear measuring scale, FIG. 2. The production of these visual marks at determined periods by styles 30 and 53 can be attained by different devices. In the example illustrated in the FIGS. 4 and 5 the following device is provided.

Casing 31, FIG. 5 contains a clockwork, now shown in the drawing, the driving mechanism of which is provided with a shaft 32. Shaft 32 has attached thereto a conical disc 33 of a friction clutch. Over disc 33 there is arranged another disc 34 having a conical recess. Disc 34 is arranged loose on the shaft 32 and is coupled with the clockwork by the friction clutch if it is not retained by an obstacle. (See 61, 62, FIG. 4.)

Disc 34 is of non-conducting material and provided on its surface with one or several conducting segments 35. The segments are arranged at equal distances from one another. On the surface of disc 34 slides a contact 36, connected by wire 37 with the pole of battery 21 opposite to the above mentioned pole. Shaft 32 is connected with conducting segments 35. Against shaft 32 slides a contact 40 connected through wire 41, resistance 42 and wire 43 to style 30. Contact 40 is further connected through wire 50, the resistance 51 and wire 52 to style 53.

Disc 34 is provided with a stopping device 60, which forms the above mentioned obstacle to the movement of disc 34. This stopping device comprises a cam 61 and a two arm lever 62, 63 which swings around pivot 64. Arm 62 is pressed by spring 65 against cam 61. The other arm 63 is attracted by an electromagnet 66 inserted in circuit 67 of battery 68 when the interrupter 70 is closed. If stopping device 60 is released, disc 34 with conducting segments 35 is moved in the direction of arrow 69 shown in FIG. 4.

For the observing, recording and evaluating of the aforesaid data, the following method is used:

At first by means of the radio locator and the cathodic tube devices the images of the moving target are produced in known manner, these, as described before, appear on the surface 3, as direction point $p$ and the distance point $r$. At this moment style 30 is placed on point $p$, the style 53 on the point $r$ and the interrupter 70, FIG. 4, is closed. Now one follows with style 30 the path $w$ of point $p$ and with style 53 the path of point $r$ along linear measuring scale. Every time contact 36, FIG. 4, slides over one of the conducting segments 35, the circuits through styles 30, 53 and foil layers 11, 12 are closed. In this way at predetermined periods permanent visual marks $p$, $p'$, $p''$ . . . and $r$, $r'$, $r''$ . . . are produced on layer 12.

With the device described above it is possible to evaluate the rate of change in distance and direction of a moving target, i.e., the speed of the movement of the target for the purpose for example to facilitate direction of a gun following the target.

For the evaluation of these changes it is advisable to use besides the linear measuring scale for the distance point $r$ a system of polar coordinates for the direction point $p$. This system, FIG. 2, consists of a plurality of concentric circles $c$ and straight lines radii or directions $f$, passing through center O. To each circle $c$ corresponds a value of $\theta$. The circle $C_O$ is the circle corresponding to the horizon. Circle $C_\theta$ is the circle passing through point $p$, the radius of which corresponds to the value $90°-\theta$ . . . . To each direction $f$ correspond a value of $\varphi$. For direction OS, FIG. 2, directed toward the South point $\varphi$ is O. Direction O$p$ forms with direction OS the angle $\varphi$. It is therefore possible to read in this diagram the values $(\theta, \varphi)$; $(\theta', \varphi')$; $(\theta'', \varphi'')$ for the points $p, p', p''$ . . . .

By means of this system of polar coordinates one can read immediately also the value of the differences $(\theta'-\theta)$, $(\theta''-\theta')$, $(\varphi'-\varphi)$, $(\varphi''-\varphi')$ . . . . The values of these differences can be used with known methods for giving the rates of change of the various parameters corresponding to the movement of the target.

The rate of the change of distance can be calculated in an analogous way as for the change of direction in the following way:

To each distance point $r$ corresponds a distance $r$ from the origin of the linear measuring scale; to the point $r'$ corresponds the distance $r'$ from the origin and to the point $r''$ the distance $r''$. From the values of the difference $r'-r$, $r''-r'$ . . . , can be found in known manner the rate of change of the distance of the target.

For enabling an automatic direction of the gun with the devices described before, the following additional arrangements are advantageous. Style 30, FIGS. 9 and 10, is attached to a rod 90, which swings around a pivot 91. This pivot 91 is slidably arranged in a guiding device 92 to move in the direction of the arrow 88. To the pivot is fixed a spring 87, which is anchored with its free end in said guiding device. On said pivot 91 is fixed a frame 93, which has the form of a circular segment. On the arc 94 of said frame is arranged a rheostat 95, which operates together with the conducting rod 90. The frame 93 carries a second arc 97 of conducting material, which operates together with a rheostat 98, which is fixed on the base plate 100. One end of the rheostat 95 is connected with a telegraphic line 110. One end of the rheostat 95 is connected with a telegraphic line 110. One end of the rheostat 98 is connected with another telegraphic line 111. The circuit for the before mentioned rheostat and telegraphic lines will be discribed later.

The second style 53, FIG. 7, is attached to a rod 120 which is slidably arranged in the guide 124 to move in the direction of the arrow 122. Rod 120 is held in its position by springs 130, which are anchored at their free ends.

On rod 120 is attached a contact 140 sliding on a rheostat 141 fixed in the base plate. One end of the rheostat 141 is connected with the telegraphic line 112.

The guide device 92 is of conducting material and connected by wire 114 to one pole of the battery 115, the other pole of which is connected to earth. Guide 124 for the rod 120 of the style 43 is of conducting material and connected by wire 116 to wire 114.

Telegraphic lines 110, 111, 112 pass to electric motors (not shown in the drawing) serving in known manner for the automatic direction of the gun.

If style 30 is moved following the path $w$ of the direction point $p$ the pivot 91 with the frame 93 moves in the direction of the arrow 88, FIG. 7, and at the same time the rod 90 swings around the pivot 91. These two movements bring in to the circuits corresponding parts of the resistances 95, 98 inserted in the telegraphic lines 110, 111. The changes in the current intensities in these lines act on the electric motors, serving in known manner for the automatic direction and firing of the gun.

If style 53 is moved to follow the path of the distance point $r, r', r''$ . . . corresponding parts of the rheostat 141 are brought into the circuit in the telegraphic line 112. The changes of the current intensities in this line act also on an electric motor, serving in known manner for the automatic direction of the gun.

The devices illustrated in FIG. 4 with the marking mechanism for the reflected direction points and for the distance points may be used separately or in combination with the device illustrated in FIGS. 7 and 8 containing the telegraphic line system.

For the enlargement of the diagram of the direction and the distance points $p$ and $r$ respectively, different auxiliary devices can be used. Of special advantage are mixed mechanical optical devices, by which the brightness of the points $p$ and $r$, reflected on the surface 3, FIG. 4 and FIG. 11, is not diminished by the additional light source necessary for the optical enlargement of the diagram. In a device of this kind, as exemplified in FIG. 11, the diagram positions of the points $p$, $r$ reflected on surface 3, FIG. 12, are transferred to a second surface 103, FIGS. 11 and 13, and from this surface projected in enlarged dimensions to a surface 240, FIGS. 11 and 14. Style 30, following the sequence of the direction points $p$ is attached to a similar device as illustrated in FIGS. 9 and 10, 93 is the frame of the circular segment, FIGS. 11 and 9; 95 and 98 the two rheostats; 91 the slidably arranged pivot, and 92 its guiding device.

Style 30, being affixed in any suitable manner to the swinging rod 90, is affixed to a transfer mechanism, for example, a bent rigid bar 200, which carries a style 130. Style 130 works on a plate 103, which comprises a paper layer 112 and a foil 111 of conducting material. The paper layer is provided with a system of polar coordinates $c$, $f$, and a linear measuring scale 106. Along this scale 106 operates a second style 153. Styles 130 and 153 and the plate 103 are by means of the wires 43, 52 and 20 (FIG. 6) connected to an electrically operated marking device, having the same construction as the device illustrated in FIG. 4.

Style 53 is connected with a suitable transfer mechanism, for example, the rigid bar 210 with style 153. In this way, persisting visual marks of the direction points and distance points are obtained on the surface of plate 103.

Over the plate 103 is arranged an intensive source of light 212, the light of which is reflected by a reflector 215 to the surface 112 of the plate 103. In this reflector 215 is arranged a system of lenses 220 by which surface 112 with its diagrams, intensively illuminated by lamps 212 is refracted to mirror 230 and from this mirror on enlarged scale reflected to plate 240, on which transferred and enlarged diagrams the positions of the direction and distance points can be observed.

Instead of the mechanical optical enlargement device described before, an electro-mechanical device, for example, a telewriting device, could be used. Also, by means of pure mechanical devices enlargements of the diagrams could be obtained. Finally, it would also be possible to receive enlarged diagrams in a device according to FIG. 4, by arranging between mirror 1 and plate 3 a system of optical lenses, not shown in FIG. 4.

The mechanical electrical means containing the telegraphic line system can be changed without departing from the spirit of the invention. So it is, for example, possible to replace the production of the illuminated direction and distance points $p$ and $r$ by cathodic tube rays, by another efficient device. For instance, one can produce these illuminated points by ordinary light sources, the rays of which are reflected from movable mirrors, which are displaced by electro-mechanical means controlled by the radio locator.

Instead of the mechanism described for the regulation of the current intensities in the telegraphic lines 110, 111, 112 other mechanisms can be used.

It is advisable to use the device for narrower limits for $\theta$, instead of the limits $$0 \text{ to } 360^\circ$$
$$0 \text{ to } 90^\circ$$

By this method the observation data do not disappear; they are fixed in a cumulative and permanent record allowing very exact calculations of the corrections necessitated by the movement of the target and the receipt of other data of importance for the science of gunnery. By the new method the subjective estimations of the corrections necessitated by the movement of the target are replaced with objective calculations. The new method is of special advantage for the quick training of large groups of non-skilled gunners in the art of the operation of radio locators. In addition the new method can also be used in peace- and war-time on airdromes for obtaining absolute reliable permanent records of flights on airplanes leaving and approaching the airfield.

It will be noted that since the dots $r$, $r'$, $r''$ and $p$, $p'$, and $p''$ are all made by a single circuit breaker, there is a one-to-one correspondence between the dots of each series.

What is claimed in:

1. In a radio location system, at least one cathode ray tube, means for controlling the cathode ray to produce at least one fluorescent screen spot corresponding to the object to be located in space, means moving about the screen to follow said spot, a source of electrical energy, and means for varying said energy under control of said following movement for translating the position of said spot into electrical signals of varying amplitude.

2. In a system according to claim 1, manual means for following said screen spot.

3. In a system according to claim 1, means for controlling cathode rays to produce several fluorescent screen spots corresponding to coordinates of the movement in space of the object to be located, and means for following said screen spots independently from each other.

4. In a system according to claim 1, means for controlling cathode rays to produce two fluorescent screen spots corresponding to coordinates of the movement in space of the object to be located, and manual means for following said screen spots independently from each other.

5. In a system according to claim 1, a cathode ray arrangement including means for producing two cathode rays, means for controlling the cathode rays to produce two fluorescent screen spots corresponding to coordinates in space of the object to be located, and means for following said screen spots independently from each other.

6. In a system according to claim 1, a source of electrical energy, resistance connected to said source and means for varying said resistance under control of the following movement.

7. In a system according to claim 1, means for controlling cathode rays to produce two fluorescent screen spots corresponding to coordinates in space of the object to be located, means for following said screen spots independently from each other, at least one source of energy, and two resistances connected at least to said one source, and means for varying said resistances under control of said following movements independently from each other.

8. In a cathode ray indicating system, means for representing the position of an object in space by the position of the cathode ray, means for following the cathode ray representation, and means under control of said following means for generating signals of varying amplitude corresponding to said cathode ray representation.

9. In a cathode ray indicating system, means for producing two cathode rays, at least one fluorescent screen and means for projecting said cathode rays on said screen including means for controlling said cathode rays to produce coordinate representations of an object moving in space, means for following said cathode ray projections and means under control of said following means for generating signals corresponding to said cathode ray representations.

10. In a radio location system, two cathode ray projection systems including at least one fluorescent screen and means for controlling said cathode ray systems to represent two parameters of the position of an object moving in space to be located as spots on said fluorescent screen, means for following said spots, energy supply means, impedance means connected to said energy supply means, and means under control of said following means for varying said impedance means to translate said parameters into corresponding electrical values of varying amplitude.

11. In a radio location system, at least one cathode ray system having a fluorescent screen, and means for controlling said cathode ray system to represent the position of the object to be located as a spot on said fluorescent screen, means for following said spot, energy supply means, resistance means connected to said energy supply means and means under control of said following means for varying said resistance means to translate said position into electrical values.

12. In a cathode ray indicating system, means for producing several cathode rays in accordance with the coordinate of any object moving in space, means for reproducing the position of the cathode rays in substantially planar representations, energy supply means, means for following the cathode ray representation, several impedance means connected to said energy supply means and corresponding to different parameters of said position in planar representation, and means under control of said following means for varying said several impedance means simultaneously in accordance with the varying parameters of the cathode ray movement in said planar representation.

13. In a cathode ray indicating system, means for reproducing the position of the cathode ray in substantially planar representation, means for following the cathode ray representation a pair of resistance means corresponding to two parameters of said position in said planar representation, and means under control of said following means for varying said two resistance means substantially simultaneously in accordance with the varying parameters of the cathode ray movement in said planar representation.

14. In a cathode ray indicating system, means for producing several cathode rays under control of several parameters of an object moving in space, means for reproducing the position of said cathode rays in multi-parameter representation, means for following the cathode ray representation, energy supply means, several impedance means connected to said energy supply means and corresponding to the number of parameters and means under control of said following means for controlling said several means independently from each other and in accordance with the varying coordinates of the cathode ray representation.

15. System according to claim 14 comprising means coupled to at least part of said following means for reproducing said cathode ray representation on a different scale.

16. In a cathode ray indicating system, means for reproducing the position of two cathode rays in independent planar representations, corresponding to coordinates of an object moving in space, means for following said cathode ray representations, energy supply means, two impedance means connected to said energy supply means, and means under control of said following means for controlling said two impedance means substantially independently from each other to produce electrical values of varying amplitude in accordance with the varying coordinates of said cathode ray representation.

17. System according to claim 16 comprising means coupled to said following means for reproducing said planar representations on a common plane.

18. System according to claim 16 wherein the different planar representations are arranged in a common plane and means coupled to said following means for reproducing said representations on another common plane.

19. In a radio location system, means including a cathode ray indicating system under control of several coordinates of an object moving in space for reproducing the position of several cathode rays in substantially two-dimentional-representations, means for following said cathode ray representations, several means for varying electrical values, and means under control of said following means for varying said several electrical values in accordance with varying coordinates of said cathode ray representations.

20. System according to claim 19 comprising means coupled to said following means for producing cathode ray representations on a common plane.

21. System according to claim 20 comprising means coupled to said following means for producing cathode ray representations on a different scale.

22. System according to claim 19 comprising means for reproducing several substantially independent two-dimensional cathode ray representations corresponding to different coordinates of the position of the object to be located in space, means for projecting said different representations onto a common plane, and means for following each of said different two-dimensional-representations substantially simultaneously, but independently, from each other one of said following means including means under control of two-dimensional-cathode ray representations associated therewith for producing electrical signals corresponding to the coordinates of said two-dimensional-cathode ray representation.

23. System according to claim 22 comprising means under control of said different following means for reproducing said different two-dimensional-representations on a common representation plane and at a predetermined scale.

24. In a radio location system, the steps of controlling at least one cathode ray to produce a fluorescent screen spot corresponding to the object to be located in space, moving a pointer following said spot and producing electrical energy and varying its amplitude under the control of the following movement for transmission of the position of said spot.

25. In a system according to claim 24, the step of moving said pointer in contact with said spot.

26. In a system according to claim 24, the steps of controlling several cathode rays to produce several fluorescent screen spots corresponding to coordinates in space of the object to be located, and moving several pointers for following said several screen spots independently from each other.

References Cited in the file of this patent

UNITED STATES PATENTS 2,514,351 Smith ------------------ July 4, 1950